United States Patent
Krise

[19]

[11] Patent Number: 5,993,031

[45] Date of Patent: Nov. 30, 1999

[54] DECORATIVE AUTOMOBILE HOOD LIGHT

[76] Inventor: David Lee Krise, 59 Friars La., Hartly, Del. 19953

[21] Appl. No.: 09/020,212

[22] Filed: Feb. 6, 1998

[51] Int. Cl.[6] .................................................. F21V 33/00
[52] U.S. Cl. .......................... 362/496; 362/806; 362/127
[58] Field of Search .............................. 446/75, 77, 485; 362/806, 253, 133, 127, 496

[56] References Cited

U.S. PATENT DOCUMENTS

| | | | |
|---|---|---|---|
| D. 152,390 | 12/1949 | Brenner | D48/20 |
| D. 162,890 | 10/1951 | Schwarz | D48/4 |
| D. 308,113 | 5/1990 | Lewis | D26/73 |
| D. 322,331 | 12/1991 | Tsuji | D26/97 |
| 883,865 | 4/1908 | Dahn . | |
| 2,248,883 | 7/1941 | Lehigh . | |
| 2,891,235 | 6/1959 | Halpert | 362/496 X |
| 4,779,171 | 10/1988 | Ferguson | 362/100 |
| 5,195,819 | 3/1993 | Chaut | 362/253 |
| 5,307,248 | 4/1994 | Wenzlick | 362/496 |
| 5,521,806 | 5/1996 | Hutzel et al. | 362/496 X |
| 5,613,760 | 3/1997 | Dunn | 362/806 X |
| 5,644,287 | 7/1997 | Nouri | 362/496 X |

*Primary Examiner*—Laura K. Tso
*Attorney, Agent, or Firm*—John C. Andrade, Esq.

[57] ABSTRACT

A decorative simulated automobile hood light is disclosed. The hood light contains a light source with light passing through the front and the rear of the enclosure for the light source, which is a simulated automobile hood. The hood can be raised or lowered, permitting access to the light source and simulating the opening and closing of an automobile hood.

17 Claims, 3 Drawing Sheets

DECORATIVE AUTOMOBILE HOOD LIGHT

BACKGROUND

This invention relates to a decorative automobile hood light for use by automobile racing enthusiasts, particularly useful in conjunction with stickers and other paraphernalia typically associated with automobile racing.

There are various wall lamps on the market, and a few are in the shape of an automobile vehicle. With the tremendous increase in interest and attendance at automobile races, there is a substantial market for items associated with automobile racing. One object of the present invention is to provide a useful wall light in a form that is appealing to automobile racing enthusiasts. Another object of the present invention is to provide a wall lamp where individual owners can easily customize the wall lamp to have an appearance reflective of their particular interests in automobile racing. These and further objects of the invention will be apparent from the following description of preferred embodiments thereof.

BRIEF SUMMARY OF THE INVENTION

The decorative simulated automobile hood light includes a light source within an enclosure, the enclosure being the shape of an automobile hood. The enclosure has a front and rear member, each having at least one opening for light to pass through; a top and bottom member positioned on top and bottom, respectively, of the front and rear members and opposite each other; and two side members positioned opposite each other between the top and bottom members and between the front and rear members.

One end of each side of the automobile hood light enclosure is hinged to the bottom member so that the sides can pivot against the bottom member, permitting the sides to rotate at least 15 degrees, permitting access to the light source. An arm extending from and rotably attached to a side member is a preferred means for holding the sides up in the rotated position.

The light source can be connected to an electrical power source or can be battery operated. The hood light also preferably includes means for switching the light source off and on, and such switching means should extend outside of the enclosure.

Preferred means for holding the sides to the bottom member in the closed position would be a magnet attached to the front member. The top of the hood light is removably attached to the sides, permitting access to the light source. The top of the hood light is a relatively flat surface, suitable for placing racing stickers on such surface. The sides of the hood light preferably contain openings suitable for light from the light source to pass through, and the hood light also preferably contains means for partially blocking the light from passing through some of the openings in the front, rear, or side members.

The automobile hood light can also be used as a carrying case for miniature cars by adding a means for carrying the light, such as a handle. The battery-generated light source makes use of the light as a carrying case especially convenient.

Furthermore, shelves for holding miniature cars can be attached perpendicular to an extension member extending on the same plane as the rear member of the hood light. The shelves would be perpendicular to the extension member, which preferably would be rotably attached to the rear member. The shelves would be removable for ease of carrying.

BRIEF DESCRIPTION OF THE DRAWINGS

The invention is further described in connection with the accompanying drawings in which.

DESCRIPTION OF THE PREFERRED EMBODIMENTS

Figure 1:
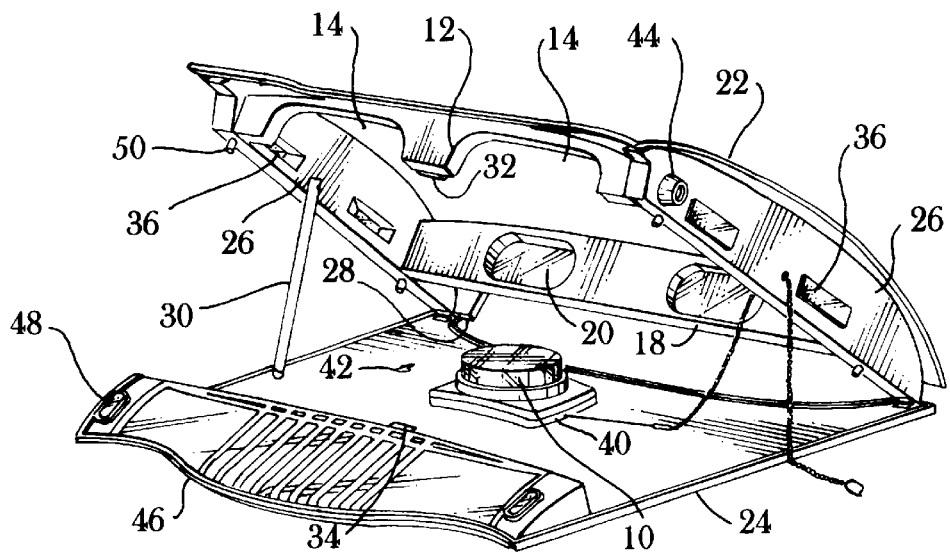
FIG. 1 is a front view of the automobile hood light of the present invention with the hood in the raised position.
Figure 4:
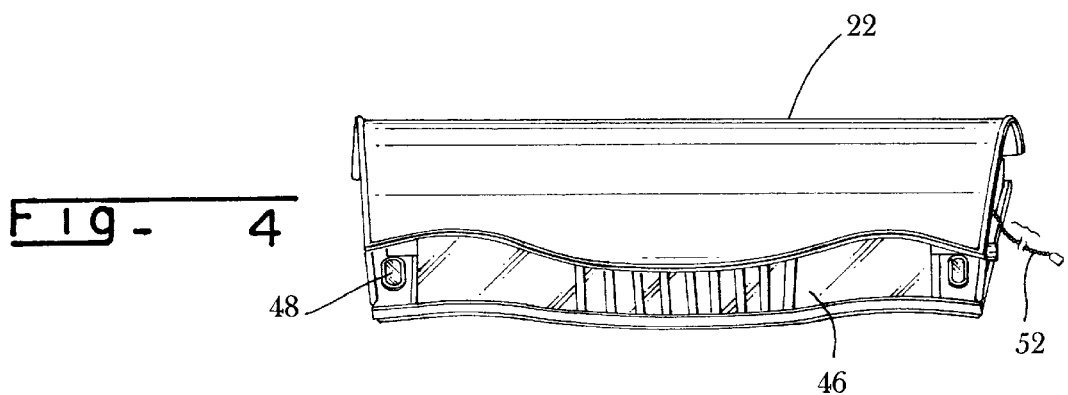
FIG. 4 is a front view of the automobile hood light of the present invention with the hood in the closed position.

FIG. 1 shows the enclosure for the light source 10 and the exterior of the enclosure which forms the simulated automobile hood. The light source 10 is shown sitting on top of an enclosure 40 for a battery. Electrical power can be provided in addition to or in place of the battery, but in that case, a plug to hook up to an electrical power source 52 as shown in FIG. 4 would be needed.

The enclosure in the shape of the automobile hood is comprised of a front member 12, rear member 18, top member 22, bottom member 24, and two side members 26. Both the front 12 and rear 18 members have at least one opening for light to pass through. FIG. 1 shows two openings 14 in the front member and two openings 20 in the rear member. The top member 22 is positioned on top of the front 12, rear 18, and side 26 members and is preferably removably attached to the sides 26 and the top of the front 12 and rear 18 members. Any type of removable attachment that can be used would be suitable, such as hook and felt-type of fastening system like "Velcro" fasteners. The bottom member 24 is positioned underneath the light source 10 and opposite the top member 20 when the top member 20 is in the closed position.

In order to be able to open and close the hood, one end of each side is attached by hinges 28 to the bottom member so that the sides can pivot against the bottom member 24, permitting the sides to rotate at least 15 degrees and permitting access to the light source 10. As shown in FIG. 1, the rear end of the sides 26 is hinged to the bottom 24. Means for holding the sides 26 up in a rotated or open position is shown in FIG. 1 by an arm 30 extending from and rotably attached to a side member 26. In order to hold the sides in the non-rotated or closed position, a magnet 32 is shown in FIG. 1 as the holding means, and a metal piece 34 would be attached to said bottom member 24 directly underneath the magnet 32 so that the magnet 32 may hold the hood in the closed position. The hood light can be hung on a wall by including two teardrop or keyhole-shaped holes 42 in the bottom member so that the hood light can be placed on the wall with a nail or hook protruding through the openings 42 (only one opening shown in FIG. 1), but the openings should be evenly spaced, approximately half way between the center and each side of the bottom member and approximately two-thirds of the way towards the rear of the bottom member). When the hood is in the closed position, the pegs 50 would be aligned with holes (not shown) in bottom member 24 for alignment purposes.

Figure 2:
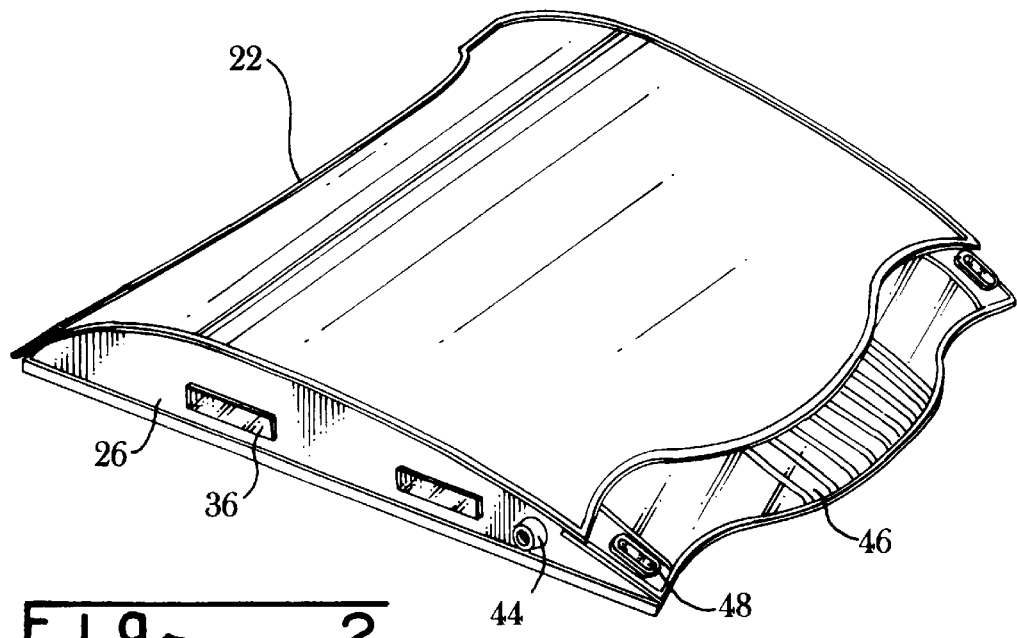
FIG. 2 is a top view of the automobile hood light of the present invention with the hood in the closed position.
Figure 3:
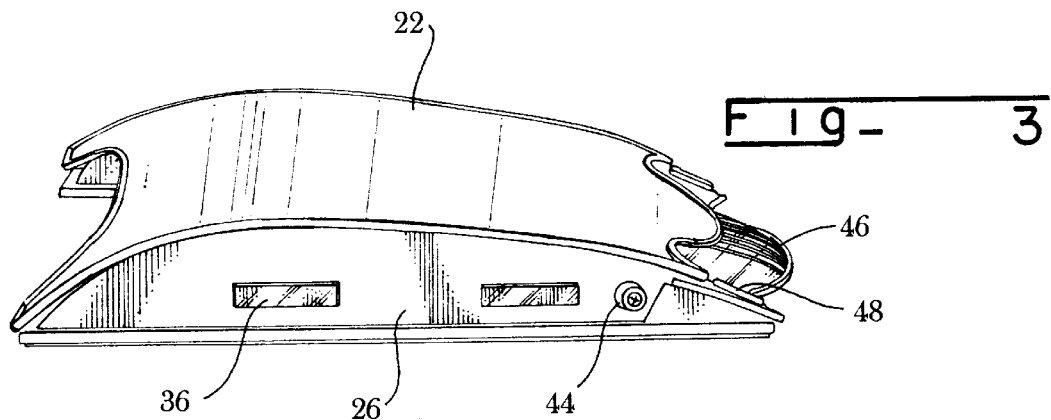
FIG. 3 is a side view of the automobile hood light of the present invention with the hood in the closed position.

FIGS. 2 and 3 give a better view of the openings 36 in the side members 26 and knob 44 which is rigidly attached to side member 26, preferably on both sides, and is used to raise or rotate the hood to the rotated or open position. FIGS. 2 and 3 also give a view of the top member 22, and the large surface area suitable for placing stickers representing the owner of the hood light's interests in racing, such as a particular driver or racing team.

FIG. 4 shows the decorative front grill 46 which simulates the front grill of a car, and the portion of the simulated front grill that is aligned with the openings 14 of the front member 12, as shown in FIG. 1, can be clear plastic to simulate white headlights or can be a different color if one is preferred. The simulated front parking lights 48 are not preferably in front of the openings and would typically be of some type of yellow reflective material.

Figure 5:
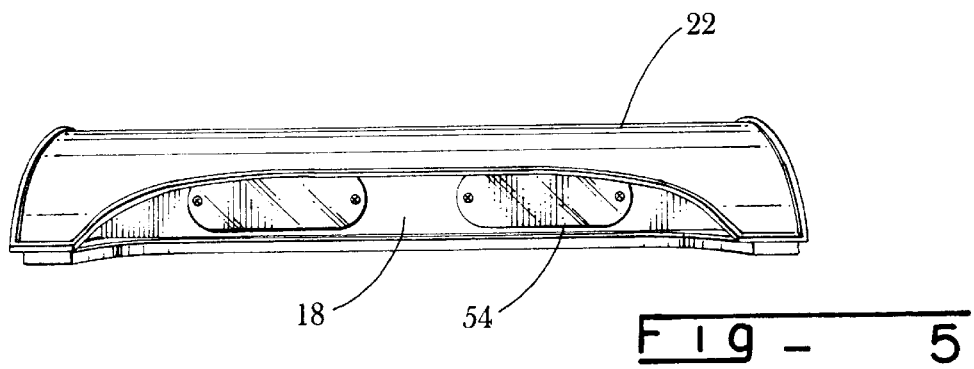
FIG. 5 is a rear view of the automobile hood light of the present invention with the hood in the closed position.

FIG. 5 shows a means for blocking 54 the openings 20 in the rear member 18 as shown in FIG. 1 if it is preferred that no light pass through the rear of the vehicle. On the other hand, if the material utilized is instead, for example, a red transparent plastic instead of a solid opaque material, then the rear would simulate brake lights on the rear of a vehicle.

Figure 6:
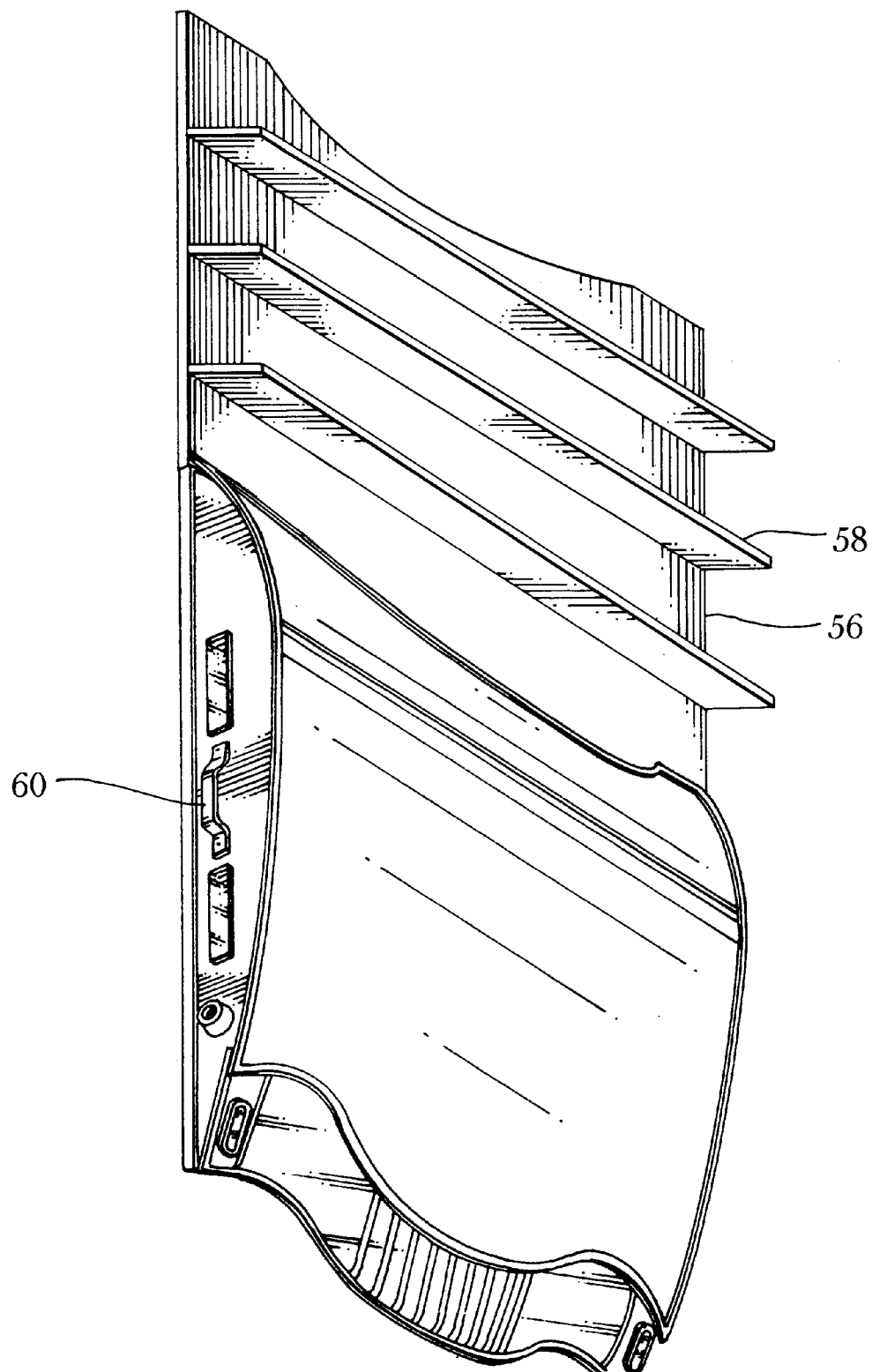
FIG. 6 is a side view of the decorative automobile hood light of the present invention, including an extension thereof.

FIG. 6 shows an extension member 56 from the rear of the hood light which, when the hood light is hung on the wall, would sit above the hood light and be illuminated through the rear openings in the hood light. Also shown are the shelves 58 that would be attached to the extension 56 so that miniature vehicles could be placed on the shelves when the hood light, extension, and shelves are hung on the wall. The shelves are preferably made of clear plastic so the light shining through the rear of the hood light can pass through the shelves. The extension member 56 extends from and on the same plane as the rear member 18 as shown in FIG. 1. The shelves are suitable for holding miniature cars and extend perpendicular to the extension member 56 and are removably attached to the extension member 56. The extension member 56 can be notably attached to the rear member so that it can rotate 180 degrees and be easily transported with the hood light. Means for carrying the hood light would be a handle 60 as shown in FIG. 6. The enclosure is suitable for holding miniature cars and can double as a carrying case for miniature cars.

I claim:

1. A decorative simulated automobile hood light, comprising: (a) a light source; (b) an enclosure for said light source in the shape of an automobile hood, having a front member having an opening for light to pass through, a rear member, having an opening for light to pass through, a top member positioned on top of said front and rear members and a bottom member positioned opposite said top member underneath said front and rear members, and two side members positioned opposite each other and in between said top and bottom members in between said front and rear members.

2. The decorative simulated automobile hood light as set forth in claim 1 in wherein one end of each side is hinged to said bottom member so that said sides can pivot against said bottom member permitting said sides to rotate at least 15 degrees permitting access to said light source.

3. The decorative simulated automobile hood light as set forth in claim 2 further comprising a means for holding said sides up in a rotated position.

4. The decorative simulated automobile hood light as set forth in claim 1 wherein said light source is connected to an electrical power source.

5. The decorative simulated automobile hood light as set forth in claim 1 wherein said light source is powered by a battery.

6. The decorative simulated automobile hood light as set forth in claim 2 further comprising means for holding said sides to said bottom member.

7. The decorative simulated automobile hood light as set forth in claim 3 wherein said holding means comprises an arm extending from and rotably attached to said side member.

8. The decorative simulated automobile hood light as set forth in claim 6 wherein said holding means comprises a magnet.

9. The decorative simulated automobile hood light as set forth in claim 1 wherein said top is removably attached to said sides and can be removed permitting access to said light source.

10. The decorative simulated automobile hood light as set forth in claim 1 wherein said top is a flat surface suitable for placing racing stickers on.

11. The decorative simulated automobile hood light as set forth in claim 1 further comprising openings in said sides suitable for light from said light source to pass through.

12. The decorative simulated automobile hood light as set forth in claim 1 further comprising means for partially blocking said openings to prevent light from passing through some of said openings.

13. The decorative simulated automobile hood light as set forth in claim 1 further comprising means for switching said light source off and on, said switching means connected to said light source and extending outside of said enclosure.

14. The decorative simulated automobile hood light as set forth in claim 1, further comprising shelves suitable for holding miniature cars and an extension member, extending from and on the same plane as the rear member, said shelves attached perpendicular to said extension member.

15. The decorative simulated automobile hood light as set forth in claim 14, wherein said shelves are removably attached to said extension member.

16. The decorative simulated automobile hood light as set forth in claim 1, further comprising means for carrying said hood light.

17. The decorative simulated automobile hood light as set forth in claim 15, wherein the extension member is notably attached to said rear member and further comprising means for carrying said hood light.

* * * * *